United States Patent [19]

Lee

[11] 4,338,009
[45] Jul. 6, 1982

[54] BISTABLE ACTUATING MECHANISM FOR OPTICAL APPARATUS

[75] Inventor: James K. Lee, Pittsford, N.Y.

[73] Assignee: Eastman Kodak Company, Rochester, N.Y.

[21] Appl. No.: 271,151

[22] Filed: Jun. 8, 1981

[51] Int. Cl.³ ............................................. G03B 19/12
[52] U.S. Cl. .................................... 354/152; 354/234
[58] Field of Search ............................. 354/152–158, 354/234, 235; 350/422, 269, 289, 315

[56] References Cited

U.S. PATENT DOCUMENTS

| 3,852,791 | 12/1974 | Eukuda | 354/152 |
|---|---|---|---|
| 3,987,473 | 10/1976 | Kondo | 354/234 |
| 4,024,552 | 5/1977 | Kondo | 354/234 |
| 4,033,693 | 7/1977 | Payrhammer et al. | 355/71 |
| 4,060,313 | 11/1977 | Kondo | 350/269 |
| 4,086,581 | 4/1978 | Ito et al. | 354/23 |
| 4,088,405 | 5/1978 | Pustka et al. | 354/234 X |

Primary Examiner—John Gonzales
Attorney, Agent, or Firm—Thomas H. Close

[57] ABSTRACT

In optical apparatus such as a photographic camera having a pivotally mounted element moveable between a first position and a second position, an actuating mechanism includes a bistable toggle device which urges the element toward the first position when the element is nearer the first position, and toward the second position when nearer that position, and an electromagnetic motor, connected to the element, that moves the element in response to an applied pulse of electrical energy toward the second position when the element is in the first position and toward the first position when the element is in the second position.

5 Claims, 17 Drawing Figures

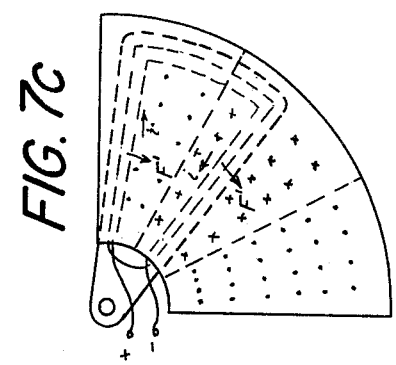
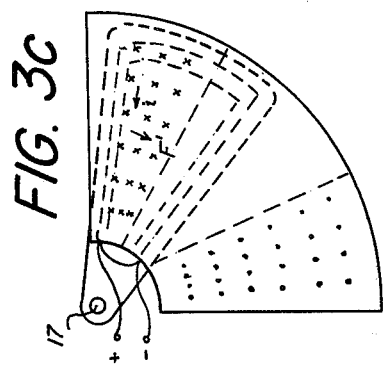
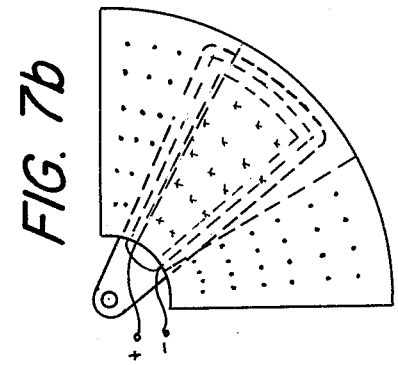
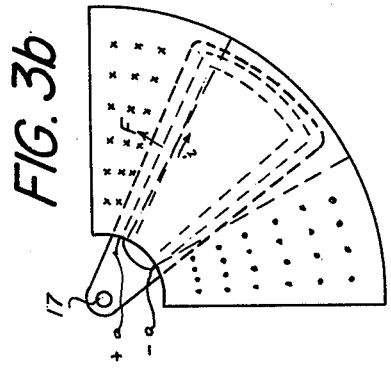
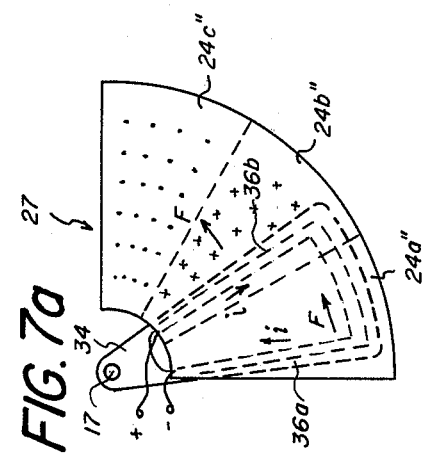
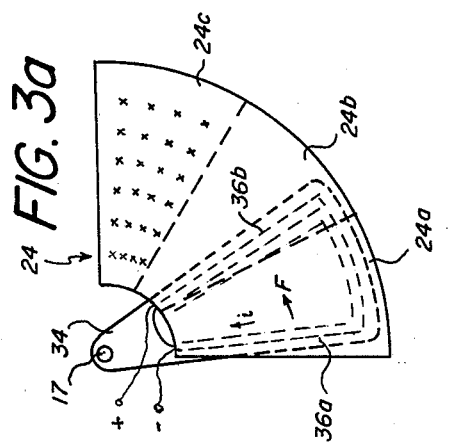

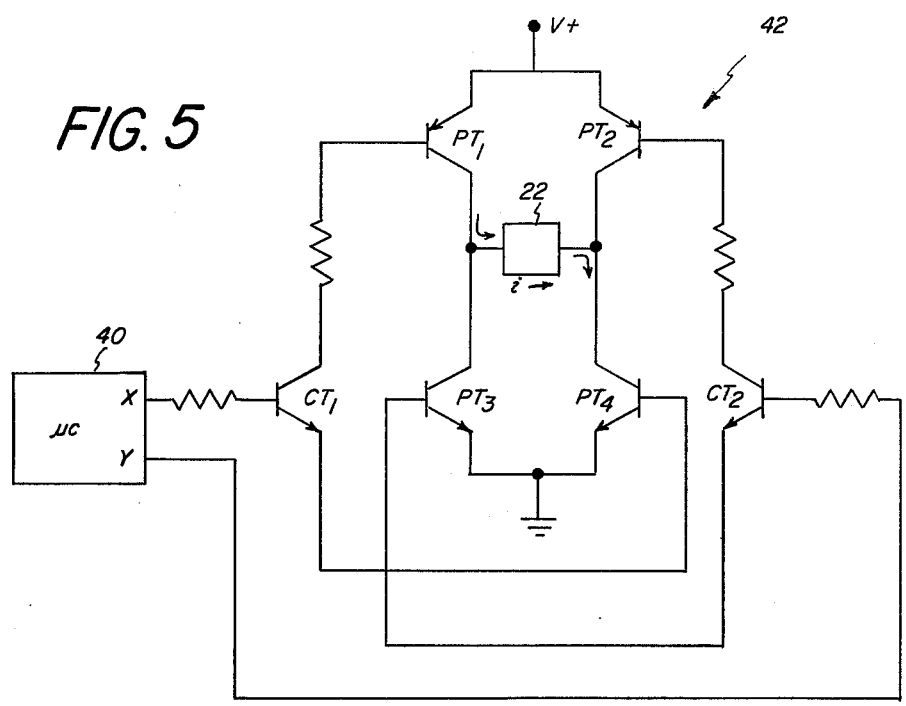
FIG. 5
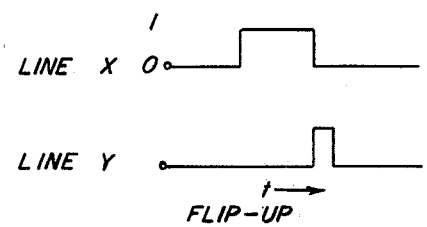
FIG. 6a
FIG. 6b
FLIP-UP
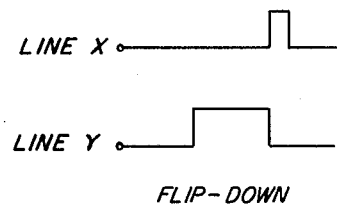
FIG. 6c
FIG. 6d
FLIP-DOWN FIG. 8
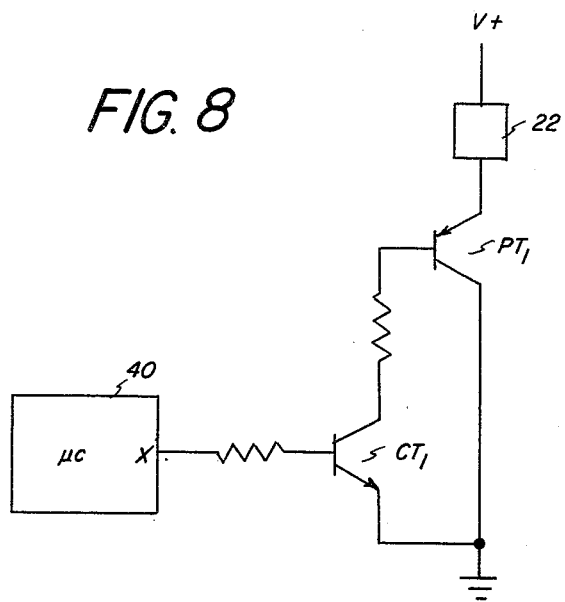
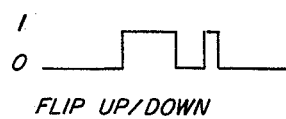
FLIP UP/DOWN
FIG. 9

4,338,009

BISTABLE ACTUATING MECHANISM FOR OPTICAL APPARATUS

BACKGROUND OF THE INVENTION

1. Field of the Invention

This invention relates to optical apparatus such as photographic cameras and more particularly to apparatus especially adapted to electronic control for moving an element in such a camera.

2. Description of the Problem

The recent trend in the control of photographic cameras is toward the use of microprocessors as general purpose programmed logic control elements. As this trend continues, more and more of the features previously provided by mechanical linkages are being provided by electromechanical transducers. Some of the resulting advantages are lower costs, higher reliability, and greater versatility. Even the most advanced electronically controlled cameras today still contain a considerable amount of mechanical complexity. FIG. 1 of U.S. Pat. No. 4,086,581 issued Apr. 25, 1978 to Ito et al, provides an excellent illustration of the profusion of gears and levers used to move some elements in even the most highly evolved computer controlled cameras of today. One of the elements moved by mechanical linkages is the reflex viewing mirror in a single lens reflex camera. Other moveable elements could include, for example, close-up lens elements, or filter elements. As shown in FIG. 1 of the '581 patent, the viewing mirror is controlled by a complex train of levers and springs, first set in motion by an electrical signal applied to a solenoid.

Briefly, the function of the mirror control apparatus is to pivot the viewing mirror out of the optical path of the camera just prior to each exposure, and to return the mirror to the viewing position at the completion of exposure. It would be desirable to accomplish this function electronically, under control of the logic control element of the camera with a minimum of mechanical complexity. The problem faced by the inventor, therefore, was to provide an electromechanical transducer for reliably moving an element such as the reflex mirror in optical apparatus such as a single lens reflex camera, while avoiding the mechanical complexity of the prior art actuating mechanisms.

SOLUTION OF THE PROBLEM—SUMMARY OF THE INVENTION

The above noted problem is solved according to the present invention by an actuating mechanism comprising a bistable toggle device for urging a pivotally mounted element toward a first position when the element is closer to the first position and for urging the element toward a second position when the element is closer to the second position, and an electromagnetic motor connected to the element and responsive to a pulse of electrical energy for moving the element against the urging of the toggle device to the second position from the first position, and to the first position from the second position. A drive circuit responsive to control signals from a logic control element such as a microprocessor provides the pulses of electrical energy to the motor. According to one embodiment of the invention, the motor is responsive to a pulse of a first polarity for moving a reflex mirror in a single lens reflex camera from a viewing position to a taking position, and to a pulse of opposite polarity for moving the mirror from the taking position to the viewing position, and the drive circuit is a bidirectional drive. According to another embodiment of the invention, the motor is responsive to a pulse of electrical energy of a first polarity for moving the mirror from the viewing position to the taking position, and responsive to a pulse of the same polarity for moving the mirror from the taking position to the viewing position, and the drive circuit is a unidirectional drive circuit, thereby simplifying the electronics.

According to the preferred embodiment of the invention, the bistable toggle device comprises a simple overcenter spring connected between the body of the camera and the pivotally moveable element, and the electromagnetic motor comprises an armature composed of a planar moving coil having first and second legs disposed generally radially of the pivot axis of the element, the first leg being in the vicinity of a first magnetic field when the element is in the first position and the second leg being in the vicinity of a second magnetic field when the element is in the second position.

BRIEF DESCRIPTION OF THE DRAWINGS

The invention will be described with respect to the drawings, wherein:

FIGS. 3a-c are schematic diagrams illustrating the operation of one embodiment of a mirror actuating mechanism according to the present invention;

FIG. 5 is a schematic circuit diagram of a bidirectional drive circuit suitable for use with the embodiments shown in FIGS. 3a-c and 4a-b;

FIGS. 6a-d are idealized waveform diagrams useful in explaining the operation of the bidirectional drive circuit shown in FIG. 5;

FIGS. 7a-c are schematic diagrams illustrating the operation of a further alternative embodiment of a mirror actuating mechanism according to the present invention;

FIG. 8 is a schematic diagram of a unidirectional drive circuit for use with the embodiment of the mirror actuating mechanism shown in FIGS. 7a-c; and FIG. 9 is an idealized wave form diagram useful in describing the operation of the drive circuit shown in FIG. 8.

DESCRIPTION OF THE PREFERRED EMBODIMENTS

Figure 1:
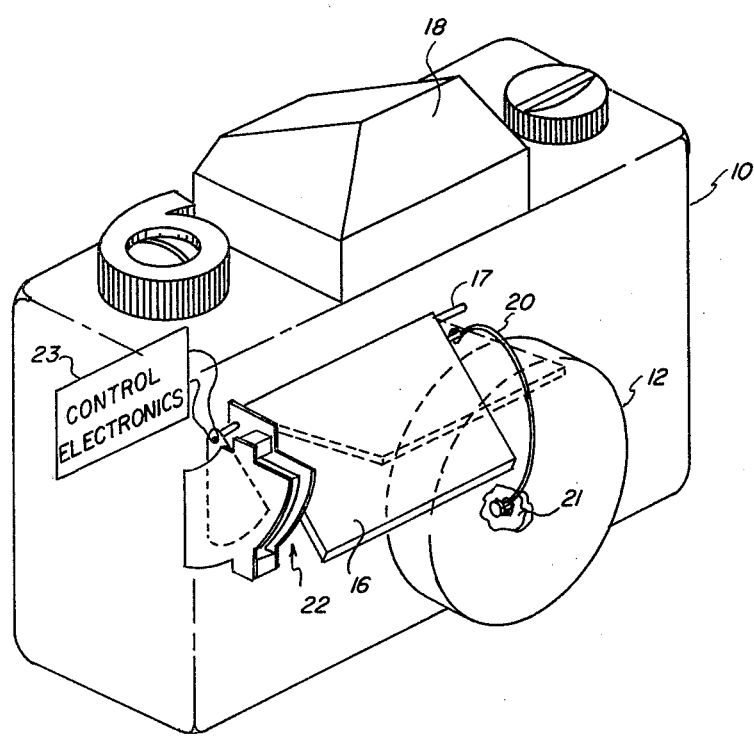
FIG. 1 is a perspective view of a mirror actuating mechanism according to the present invention, in a single lens reflex camera.

Referring first to FIG. 1, a mirror actuating mechanism according to the present invention is shown in a single-lens reflex camera. The camera, generally designated 10, includes a single lens 12 used for both viewing a scene and taking the picture. A reflex mirror 16 is hinged for pivotal movement about an axis 17 between a viewing position shown by solid lines in FIG. 1 and a taking position shown in phantom in FIG. 1. In the viewing position, the mirror 16 intercepts the optical path of taking lens 12 and deflects the optical path to a viewing prism (not shown) contained in the tentshaped housing 18 on top of the camera. In the taking position, the mirror is pivoted out of the way of the optical path of single lens 12 to allow the film (not shown) located behind the mirror 16 to be exposed.

The mirror is held in the taking position or the viewing position by a bistable toggle means, such as toggle spring 20, connected between the mirror 16 and a portion 21 of the body of the camera. The toggle spring urges the mirror toward the viewing position when the mirror is closer to the viewing position, and toward the taking position when the mirror is closer to the taking position. A motor generally designated 22, is connected to pivot axis 17 and adapted to move the mirror between the viewing position and the taking position in response to signals supplied from control electronics 23.

Figure 2:
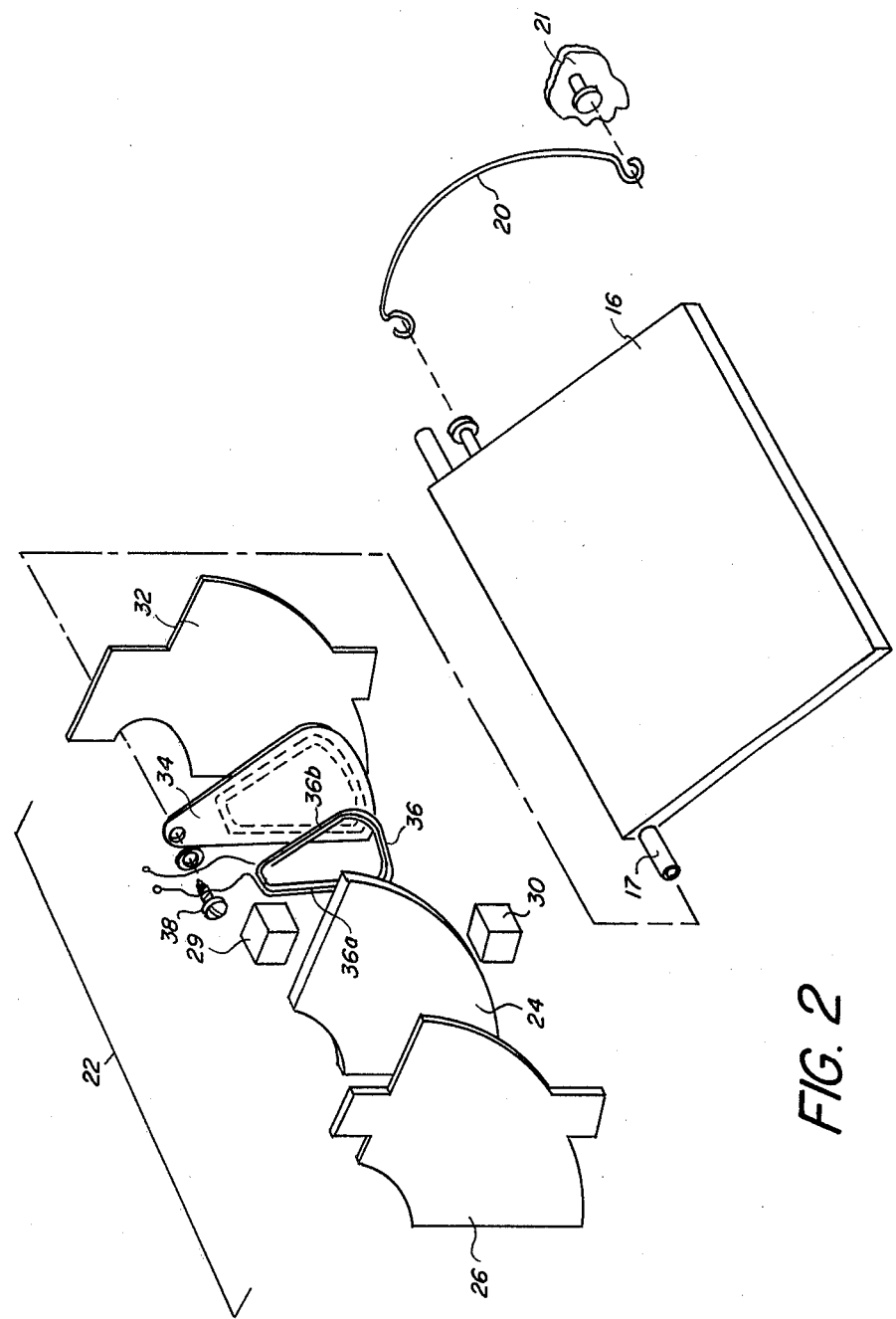
FIG. 2 is an exploded perspective view of the mirror actuating mechanism shown in FIG. 1.

Motor 22, as shown in more detail in FIG. 2, includes a permanent magnet 24 (such as a ceramic magnet) which is attached to a ferromagnetic plate 26 (fabricated for example from mild steel). Spaced from plate 26 by a pair of non-magnetic spacers 29 and 30, is a second ferromagnetic plate 32. Spacers 29 and 30 form a gap approximately 1 millimeter wide between magnet 24 and plate 32. Disposed within the gap is an armature sector comprising a support blade 34 of non-magnetic material such as brass, aluminum or plastic, and a conductor coil 36. The coil is formed for example from about 100 turns of No. 36 copper wire fixed to support blade 34, for example, by adhesive. Coil 36 defines two generally radial legs 36a and 36b. Alternatively, coil 36 may be photofabricated on support plate 34 by well-known photolithographic techniques, or incapsulated in support blade 34 by well-known plastic forming techniques. The armature sector is attached to the mirror axis by means of a screw 38. When current is supplied to coil 36 by the control electronics (not shown in FIG. 2) a torque is generated on axis 17 to move the mirror from one position to another.

According to one embodiment of the motor 22, the permanent magnet 24 is divided into three segments, 24a-c as shown in FIG. 3a. In segment 24a, the magnetic field is directed out of the page as seen in FIG. 3a, as indicated by the arrow heads. Segment 24b, is essentially unmagnetized, and in segment 24c, the magnetic field is directed into the page as illustrated by the arrow tails. As shown in FIG. 3a, when the mirror is in the viewing position, leg 36a of coil 36 is disposed in the magnetic field formed by magnet segment 24a of permanent magnet 24, and leg 36b is in the region 24b where no field is generated by permanent magnet 24. When an electrical potential is applied to coil 36 to cause current to flow in leg 36a in a direction indicated by arrow (i) in FIG. 3a, a force F is generated on leg 36a causing the armature to apply a torque in a counterclockwise direction (as seen in FIG. 3a) on axis 17 to urge the mirror away from the viewing position and toward the taking position.

As leg 36a of coil 36 leaves the magnetic field formed by sector 24a, leg 36b enters the magnetic field formed by sector 24c. As shown in FIG. 3b, the force F generated on leg 36b is in the same direction as the force that was generated on leg 36a, thereby continuing to move the mirror from the viewing position to the taking position. To return the mirror to the viewing position from the taking position, a pulse of electrical energy of opposite polarity is applied to the coil 36, thereby creating a force F' on leg 36b in the direction to move the mirror from the taking position to the viewing position as shown in FIG. 3c.

Figure 4B:
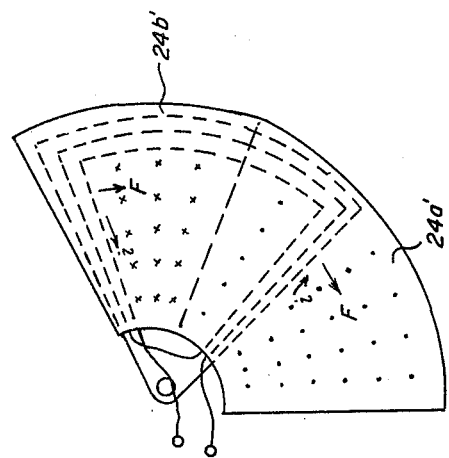
FIGS. 4a-b are schematic diagrams illustrating the operation of an alternative embodiment of the mirror actuating mechanism according to the present invention.
Figure 4A:
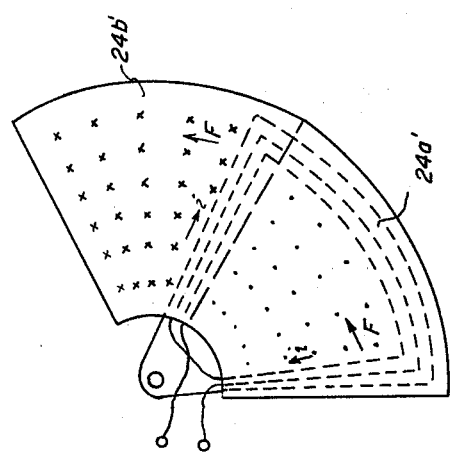

A less compact, but somewhat more powerful motor can be made by increasing the angular subtense of the coil in the permanent magnet, and dividing the magnet into only two sectors 24a' and 24b' magnetized as shown in FIG. 4a. As seen in FIG. 4a, when current is caused to flow in coil 36, both legs 36a and 36b experience a force F, simultaneously, to urge the mirror toward the taking position. When the mirror is in the taking position and the polarity of the pulse of electrical energy is reversed, both legs of the coil experience a force tending to return the mirror to the viewing position as shown in FIG. 4b.

Referring now to FIG. 5, the control electronics for powering the actuators illustrated in FIGS. 3a-c and 4a-b will be described. The control electronics comprises a microcomputer 40 that controls the camera, and a conventional bidirectional drive circuit generally designated 42. The microcomputer 40 supplies a logic signal to two output lines X and Y under control of the camera control program. The bidirectional drive circuit 42 includes a pair of control transistors CT1 and CT2 and four power transistors $PT_1-PT_4$. When a logic 1 (or high voltage) is placed on line X and a logic 0 (or low voltage) is placed on line Y, control transistor CT1 is turned on, thereby turning on power transistor $PT_1$ and $PT_4$ to allow current to flow from the power supply terminal (V+) through the actuator 22, to ground, in the direction shown by the arrow (i) in FIG. 5. When a logic 0 is applied to line X and a logic 1 to line Y, control transistor CT2 is turned on, thereby turning on power transistors $PT_2$ and $PT_3$ to cause current to flow through the actuator 22 in the opposite direction. When a logic 0 (low voltage) is applied to both lines X and Y, no current is caused to flow through the actuator. A high voltage on both lines X and Y would cause a short to ground on both sides of the actuator and is therefore not an allowable state.

The logic signals applied to the control lines X and Y to cause the mirror to flip up from the viewing position to the taking position are shown in FIGS. 6a and 6b and the signals to cause the mirror to flip down from the taking position to the viewing position are shown in FIGS. 6c and 6d. The combined effects of the motor and the bistable toggle means cause the mirror to reach the final position (either the taking position or the viewing position) with a considerable amount of momentum. In order to prevent the mirror from bouncing when it reaches its final position, the mirror is dynamically braked just prior to reaching its final position by the application of a short pulse of electrical energy of the proper polarity to resist the motion of the mirror, thereby helping to cushion the impact of the mirror on reaching its final position. The relatively short pulse on bits Y and X shown in FIGS. 6b and 6c respectively, represent dynamic braking pulses designed to minimize mirror bounce.

A considerable simplification of the drive circuit, and elimination of one control bit from the microprocessor may be achieved by configuring the actuator as shown in FIGS. 7a-c. In this embodiment, the motor is employed to give the mirror a "kick" away from its rest position, and the momentum of the mirror carries it over the top dead center of the bistable toggle device. The remaining momentum of the mirror, assisted by the bistable toggle device, carries the mirror to its final position. The magnet 24 as shown in FIG. 7a is divided into three sectors 24a"-c". The fields generated by the end sectors 24a" and 24c" are parallel to each other and pointing out of the page as shown in FIG. 7a. The field generated by the center sector 24b" is oriented in the opposite direction as indicated by the arrow tails in FIG. 7a. When a pulse of current is applied to coil 36 in the direction indicated by the arrows (i) in FIG. 7a, both legs 36a and 36b of coil 36 experience a force F tending to apply a torque to the axis 17 to move the mirror from the viewing position to the taking position. Current is removed from the coil as the actuator approaches dead center, as shown in FIG. 7b, and the momentum of the mirror is effective to carry the mirror past center, and with the aid of the bistable toggle device, on to the taking position shown in FIG. 7c. When in the taking position, a pulse of current in the same direction as before, generates forces F' in the opposite direction to return the mirror to the viewing position.

Thus, in accord with this embodiment, the actuator 22 requires pulses of only one polarity, thereby simplifying the control electronics. FIG. 8 is a schematic diagram showing a suitable control electronics for use with the embodiment described above. As seen in FIG. 8, only one control line (X) is required from the microcomputer to control the actuator. The drive circuit comprises a control transistor $CT_1$ which controls a power transistor $PT_1$. FIG. 9 is a waveform diagram of the control signal used to flip the mirror from either position to the other position. The second short pulse in the wave form is an optional dynamic braking pulse used to arrest the movement of the mirror just prior to its arrival at the intended position.

The invention has been described in detail with particular reference to preferred embodiments thereof, but it will be understood that variations and modifications can be effected within the spirit and scope of the invention, including application of the invention to moving other pivotally mounted elements such as lens elements or filter elements in optical apparatus.

I claim:

1. In a reflex camera having a viewing mirror moveable about an axis between a viewing position and a taking position, a mirror actuating mechanism, comprising:
   a. bistable toggle means for (1) urging the mirror toward the viewing position when closer to the viewing position, and (2) urging the mirror toward the taking position when closer to the taking position;
   b. electromagnetic motor means connected to the mirror axis and responsive to pulses of electrical energy for moving the mirror against the urging of said toggle means to the taking position from the viewing position and to the viewing position from the taking position; and
   c. drive circuit means responsive to control signals for supplying said pulses of electrical energy to said motor means.

2. The invention claimed in claim 1, wherein said motor means is responsive to a pulse of a first polarity for moving the mirror from the viewing position to the taking position, and to a pulse of opposite polarity for moving the mirror from the taking position to the viewing position, and wherein said drive circuit means is a bidirectional drive circuit.

3. The invention claimed in claim 1, wherein said motor means is responsive to a pulse of a first polarity for moving the mirror from the viewing position to the taking position, and for moving the mirror from the taking position to the viewing position, and wherein said drive circuit means comprises a unidirectional drive circuit.

4. The invention claimed in claim 1, wherein said electromagnetic motor means comprises a coil having first and second legs disposed generally radially of the mirror axis, first means for generating a first magnetic field in the vicinity of the first leg when the mirror is in the viewing position and second means for generating a second magnetic field in the vicinity of the second leg when the mirror is in the taking position.

5. The invention claimed in claims 1, 2, 3, or 4 wherein the bistable toggle means comprises an over-center spring connected between the body of the camera and the mirror.

* * * * *